BEST AVAILABLE COPY
G. E. RIGBY.
SPRING FRAME FOR CYCLES AND MOTOR CYCLES.
APPLICATION FILED JULY 8, 1916.
1,261,440.
Patented Apr. 2, 1918.
2 SHEETS—SHEET 1.
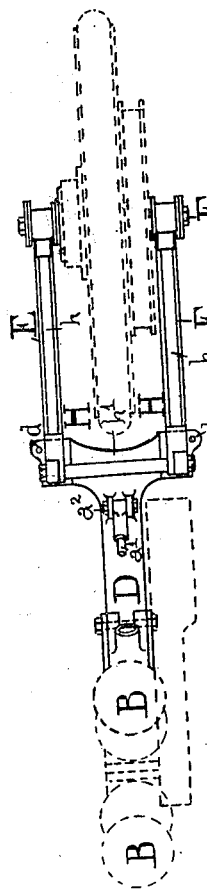
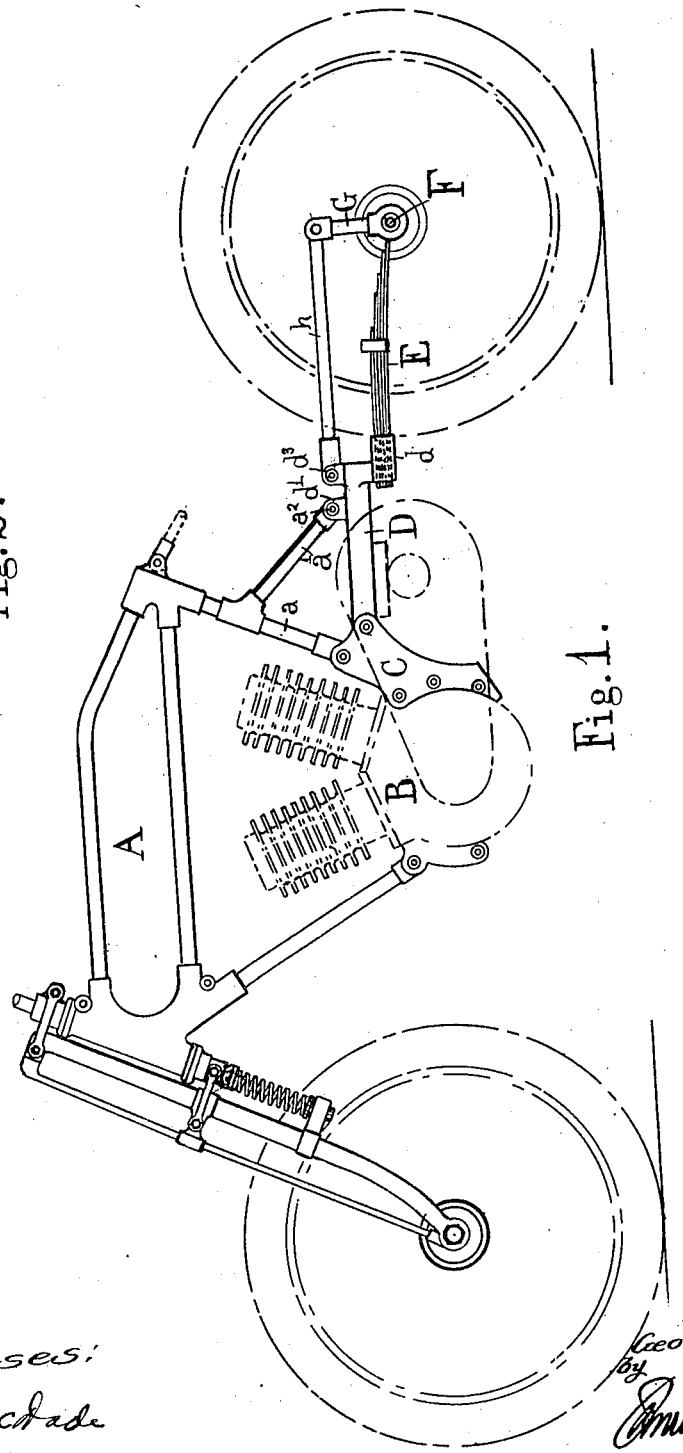

G. E. RIGBY.
SPRING FRAME FOR CYCLES AND MOTOR CYCLES.
APPLICATION FILED JULY 8, 1916.
1,261,440.
Patented Apr. 2, 1918.
2 SHEETS—SHEET 2.
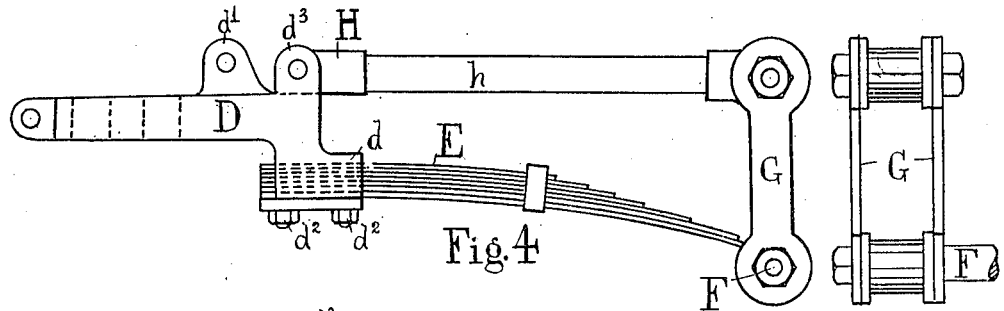
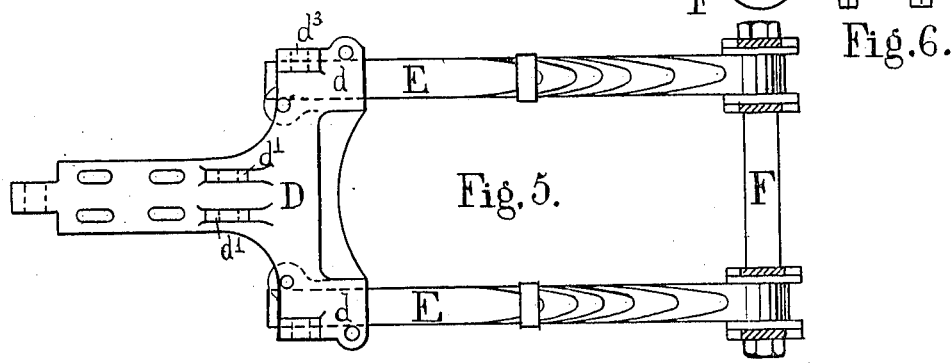
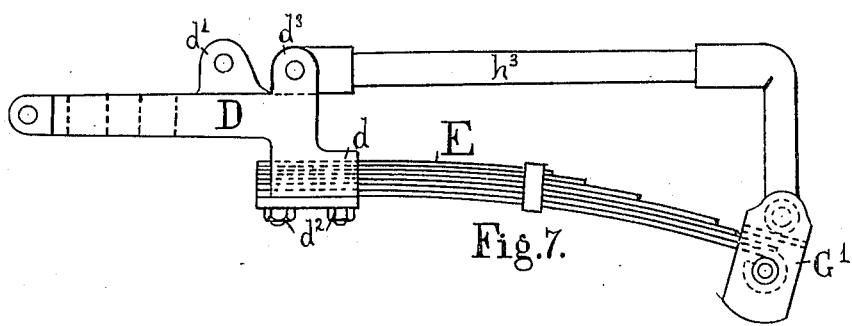
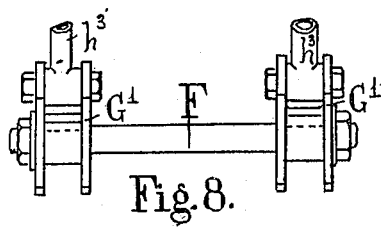
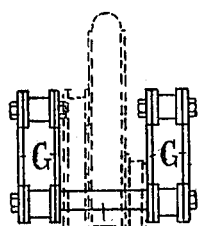
Witnesses:
M. E. McHale
Inventor
George E. Rigby

UNITED STATES PATENT OFFICE.

GEORGE EDWIN RIGBY, OF MANCHESTER, ENGLAND.

SPRING-FRAME FOR CYCLES AND MOTOR-CYCLES.

1,261,440.  Specification of Letters Patent.  Patented Apr. 2, 1918.

Application filed July 8, 1916. Serial No. 108,185.

*To all whom it may concern:*

Be it known that I, GEORGE EDWIN RIGBY, a British subject, residing at the city of Manchester, England, have invented certain new and useful Improvements in Spring-Frames for Cycles and Motor-Cycles, of which the following is a specification.

This invention relates to spring cycle frames or spring suspension for mounting the rear wheels of motor bicycles or tricycles having a single rear-driving wheel, in which rearwardly extending laminated springs support the rear axle.

It consists in the particular disposition and combination of the parts comprising a horizontal bracket rigidly carried by the main frame behind the seat pillar and fitted with two rearwardly extending members, two laminated springs attached to these members at one end and directly carrying the back axle at the other or free end, so that the springs take the place of the ordinary chain or back stays, and a fork pivoted to the spring bracket at one end and at the other end connected with the back axle bearings to give lateral stability to and synchronize the movement of the springs.

It will be fully described with reference to the accompanying drawings.

Figure 1 is a side elevation of a motor bicycle with parts removed showing the invention applied to the rear wheel.

Fig. 2 is a plan with parts of the frame removed.

Fig. 3 is a rear elevation.

Fig. 4 is a side elevation enlarged of the rigid bracket D, springs E, fork H and links G.

Fig. 5 is a plan of Fig. 4 with the fork H removed.

Fig. 6 is an end elevation of the links G at one side of rear wheel.

Fig. 7 is a side elevation of the bracket D, springs E and fork H showing a modified construction of the rear members $h^3$ of the fork.

Fig. 8 is an end elevation of the links G'.

The frame A is constructed of any ordinary or convenient shape to carry or support the engine B.

To the back engine lug or engine plate C a bracket D with two rearwardly projecting members $d$ is securely attached (or it may be cast as part of back engine lug C.) To the bracket D and to the seat tube $a$ an additional upright stay $a'$ is affixed by bolt $a^2$ passing through the lugs $d'$. The rearwardly extending members $d$ of the bracket D form housings or sockets for the laminated springs E. To each of the members $d$ of the bracket D one end of a laminated spring E is firmly fitted being secured thereto by bolts $d^2$. The springs E extend at either side of the wheel to the rear axle F taking the place of the ordinary chain or belt stays and the links G are mounted on the end of axle F on each side of the springs to connect the axle F to the fork members $h$. Preferably the axle F passes through loops in the ends of the springs E as shown but can be directly attached to the springs in any other convenient manner.

The two fork members $h$ are rigidly attached together by a transverse member $h'$ and are pivoted to the bracket D by a bolt passing through the transverse member $h'$ and lugs $d^3$ of said bracket. The members or stays $h$ permit of the desired movement of the wheel and springs E relative to the frame and at the same time prevent any lateral or tilting movement of the wheel, the wheel axle being always maintained parallel to the transverse member $h'$ and to the transverse axis of the cycle.

The laminated springs E are rigidly attached at one end to the bracket D and are free at the other end the two springs being guided synchronously by the pivoted fork or hinged rear stays $h$ to maintain the wheel axle parallel to the transverse axis of the cycle.

In the modification shown in Figs. 7 and 8 the rear members $h^3$ of the pivoted fork are of cranked shape and are at their ends connected by pivots with the links G' which are shorter than those shown in Figs. 4 to 6.

The portion of the frame carrying the engine B, gear box, carrier, stand and mudguard, is rigid, but it is suspended from road shock by means of the springs E carrying the rear wheel. Thus the jolting action is entirely absorbed by the springs, which insulate the road wheel from the rigid portion of the frame.

What I claim as my invention and desire to protect by Letters Patent is:—

1. A spring suspension means for a rear driving wheel of a motor bicycle or a tricycle, comprising a main frame having a seat pillar and bearings for the axle of the rear driving wheel, a horizontal bracket rigidly secured to the main frame in rear of the seat pillar in a plane slightly above the position of the rear wheel axle and provided with two rearwardly projecting fixed members, spring units each rigidly fixed at its front extremity to one of said fixed members, the rear extremities of the spring units being directly connected to the said bearings, a pivotally mounted bracket disposed over the springs and connected to said rigidly secured bracket and having rearwardly extending forked arms, and movable connections between the said arms and the axle bearings to synchronize the spring units and prevent tilting of the rear driving wheel.

2. A spring suspension means for a rear driving wheel of a motor bicycle or a tricycle, comprising a main frame having a seat pillar and bearings for the axle of the rear driving wheel, a bracket rigidly secured to the rear portion of the main frame in a plane slightly above the position of the rear wheel axle and having two rearwardly extending rigid members, an inclined strut between said bracket and the seat pillar, two laminated spring units having front extremities individually secured to the said bracket members and their rear extremities directly connected to the axle bearings, rearwardly extending horizontal fork members disposed above the spring units and pivotally connected at their front portions to the rigidly secured bracket, and links interposed between and pivotally connected to the rear ends of said pivoted fork members and to the axle bearings.

In testimony whereof I have hereunto set my hand in presence of two subscribing witnesses.

GEORGE EDWIN RIGBY.

Witnesses:
I. OWDEN O'BRIEN,
GEORGE H. O'BRIEN.

Copies of this patent may be obtained for five cents each, by addressing the "Commissioner of Patents, Washington, D. C."